(12) United States Patent
Lohmann

(10) Patent No.: US 8,868,354 B2
(45) Date of Patent: Oct. 21, 2014

(54) METHOD AND APPARATUS FOR TESTING VALVE CONTROL SYSTEM

(75) Inventor: Jürgen Lohmann, Hamburg (DE)

(73) Assignee: Airbus Operations GmbH (DE)

( * ) Notice: Subject to any disclaimer, the term of this patent is extended or adjusted under 35 U.S.C. 154(b) by 832 days.

(21) Appl. No.: 12/745,251

(22) PCT Filed: Nov. 29, 2007

(86) PCT No.: PCT/EP2007/010382
§ 371 (c)(1),
(2), (4) Date: Oct. 19, 2010

(87) PCT Pub. No.: WO2009/068068
PCT Pub. Date: Jun. 4, 2009

(65) Prior Publication Data
US 2011/0208442 A1    Aug. 25, 2011

(51) Int. Cl.
| G01B 5/00 | (2006.01) |
| G05B 23/02 | (2006.01) |
| G05B 19/042 | (2006.01) |
| G05B 17/00 | (2006.01) |
| G05B 19/05 | (2006.01) |
| F16K 37/00 | (2006.01) |

(52) U.S. Cl.
CPC ........ *G05B 19/0428* (2013.01); *G05B 23/0256* (2013.01); *G05B 2219/24036* (2013.01); *G05B 17/00* (2013.01); *F16K 37/0083* (2013.01); *G05B 19/056* (2013.01); *G05B 2219/24038* (2013.01)
USPC ............. 702/33; 702/105; 702/113; 702/114; 702/124; 702/183

(58) Field of Classification Search
USPC .................... 702/33, 105, 113, 114, 124, 183
See application file for complete search history.

(56) References Cited

U.S. PATENT DOCUMENTS

| 4,220,869 A | * | 9/1980 | Uram ........................... 290/40 R |
| 4,441,157 A | * | 4/1984 | Gerchman et al. .............. 702/52 |

(Continued)

FOREIGN PATENT DOCUMENTS

| EP | 0 400 612 A | 12/1990 |
| GB | 2192681 A | 1/1998 |

(Continued)

OTHER PUBLICATIONS

Decision on Granting for corresponding Russian Application No. 2010123914/08(034126) issued Feb. 17, 2012.
International Search Report for Appln. No. PCT/EP2007/010382 dated Aug. 7, 2008.

*Primary Examiner* — Sujoy Kundu
*Assistant Examiner* — Paul D Lee
(74) *Attorney, Agent, or Firm* — Carter, DeLuca, Farrell & Schmidt, LLP

(57) ABSTRACT

The present invention provides a method and apparatus for testing a valve control system in an aircraft fuel supply system having a plurality of control valves, wherein the control system includes a processor adapted to receive feedback signals from each of the plurality of control valves, the method comprising the steps of: connecting a test device to the control system such that the test device is connected for signal transmission to the processor; outputting a signal to the processor simulating a feedback signal from at least one of the control valves; detecting a control signal which is output by the processor to the at least one of the control valves; and identifying the detected control signal which is output by the processor to the control valve.

15 Claims, 5 Drawing Sheets

(56) References Cited

U.S. PATENT DOCUMENTS

| | | | |
|---|---|---|---|
| 4,575,718 A * | 3/1986 | Ludowyk | 340/3.71 |
| 5,023,791 A | 6/1991 | Herzberg et al. | |
| 5,109,692 A * | 5/1992 | Fitzgerald | 73/168 |
| 5,253,158 A * | 10/1993 | Suzuki et al. | 700/23 |
| 5,748,469 A * | 5/1998 | Pyotsia | 700/30 |
| 5,992,229 A * | 11/1999 | Pyotsia et al. | 73/168 |
| 7,327,045 B2 * | 2/2008 | Watkins | 290/1 R |
| 2007/0255515 A1 * | 11/2007 | Hoehner et al. | 702/51 |
| 2008/0237517 A1 * | 10/2008 | Krupadanam | 251/129.01 |

FOREIGN PATENT DOCUMENTS

| | | |
|---|---|---|
| RU | 41108 U1 | 4/2004 |
| RU | 2297672 C1 | 4/2007 |
| RU | 66550 U1 | 9/2007 |
| SU | 1833897 A1 | 8/1993 |
| WO | 2007/048591 A1 | 5/2007 |

* cited by examiner

METHOD AND APPARATUS FOR TESTING VALVE CONTROL SYSTEM

FIELD OF THE INVENTION

The present invention relates to a method and apparatus for testing a valve control system in an aircraft fuel supply system.

BACKGROUND OF THE INVENTION

The fuel supply systems of larger commercial aircraft typically incorporate a number of separate fuel tanks, to each of which various refuel/de-fuel lines, transfer lines, pressurization lines and vent lines are connected. Furthermore, each of these lines associated with the individual fuel tanks is respectively controlled by at least one control valve. Thus, the fuel supply system is a sophisticated arrangement of interconnected tanks and lines and the operation of the numerous individual valves is usually managed by a computer-regulated valve control system. Such a control system includes at least one processor which generates control signals to be output to the valves and monitors feedback from sensors and from the valves themselves to regulate the operation of the fuel supply system.

Ground tests conducted on an aircraft, e.g. during the assembly or commissioning of new aircraft, require a series of tests to check whether or not the processor is correctly interpreting feedback signals from the valves. Conventional techniques for conducting such tests have had a high manual component, making them time consuming to conduct, which in turn leads to longer production times and increased production costs.

Accordingly, the present invention aims to provide a method and an apparatus for testing a valve control system in an aircraft fuel supply system, and in particular, for testing the operation and performance of the computer processor in the valve control system, which is simple to implement and which is optimized from both a time and a cost perspective.

SUMMARY OF THE INVENTION

According to one aspect, the present invention provides a method of testing a valve control system in an aircraft fuel supply system having a plurality of control valves, wherein the control system includes a processor adapted to receive feedback signals from each of the plurality of control valves, the method including the steps of:
  connecting a test device to the control system such that the test device is connected for signal transmission to the processor;
  outputting a signal to the processor simulating a feedback signal from at least one of the control valves;
  detecting a control signal which is output by the processor to the at least one of the control valves; and
  identifying the detected control signal which is output by the processor to the control valve.

In a preferred form of the invention, the method involves outputting more than one signal to the processor simulating different feedback signals from a single valve. Thus, the method may involve detecting different control signals output from the processor to a particular one of the control valves.

In a preferred form of the invention, each signal that is output to the processor simulates a feedback signal identifying a particular state (e.g. an open state or a closed state) of one of the control valves. In one form, therefore, the step of outputting a signal to the processor in the inventive method includes selecting a signal identifying either an open or a closed state of the valve. Accordingly, the user can check the control signal output by the processor to determine whether the processor is registering the correct (i.e. open or closed) valve state.

In one form of the invention, each of the plurality of control valves is adapted to be operated independently by two actuator motors and the processor is adapted to receive feedback signals from each actuator motor of the plurality of control valves. Thus, the step of outputting a signal to the processor in the inventive method includes outputting a signal simulating a feedback signal from one of the valve actuator motors. In this way, the processor's ability to recognise the individual state of each of the independent actuator motors can be assessed—that is, whether each of the independent actuator motors of a particular valve is indicating an open valve state, whether each is indicating a closed valve state, or whether the independent actuator motors have different operational states.

In a preferred form of the invention, the step of identifying each of the detected control signals output by the processor to a control valve includes displaying information corresponding thereto for visual observation. This provides the operator conducting the test with immediate information regarding the test result and thus the processor performance. However, the method may also include the step of logging the test result data to a storage device for later retrieval and analysis.

In a preferred form of the invention, the method involves outputting a plurality of signals to the processor simulating feedback signals from different control valves. Thus, the method preferably includes the step of identifying the control valve for which a control signal is output by the processor.

According to the inventive method, the test device is preferably connected in communication with a relay device of the valve control system through which the signals between the processor and the control valves are directed. The connection between the test device and the processor is such that the one or more signals simulating feedback from the control valve(s) are transmitted to the processor via the relay device. This connection facilitates the performance of the processor to be tested in relation to multiple valves.

Thus, the invention provides a new testing method and apparatus that significantly improve upon the conventional techniques. In particular, the method of the invention provides a relative quick means of checking the performance of the processor in respect of a number of valves throughout the fuel supply system. A significant advantage of the invention is the saving in time and effort which is realized by the simplified approach. Although the method may involve establishing more than one connection to the processor, the connections are quickly and easily made, thereby saving time in verifying performance and operability of the control system processor.

According to another aspect, the present invention provides an apparatus for testing a valve control system in an aircraft fuel supply system having a plurality of control valves, wherein the control system includes a processor adapted to receive feedback signals from each of the plurality of control valves, the apparatus comprising:
  connector means for connection to the control system such that the apparatus is adapted for signal communication with the processor,
  signal means adapted to output a signal to the processor simulating a feedback signal from one or more of the plurality of control valves;
  detector means for detecting a control signal which is output by the processor to that one or more of the plurality of control valves; and indicator means for identifying the detected control signal output by the processor to the particular control valve.

In a preferred form of the invention, the signal means is adapted to output more than one signal to the processor simulating different feedback signals from one of the valves. Thus, the detector means is preferably adapted to detect different control signals output from the processor to a particular one of the control valves.

In a preferred form of the invention, each signal that is output to the processor simulates a feedback signal identifying a particular state (e.g. an open state or closed state) of one of the control valves. Preferably, therefore, the signal means includes means for selecting a signal identifying either an open or a closed state of the valve. The selecting means may be in the form of a switch device. In this regard, the apparatus may include a separate switch device for each of the control valves that is simulated with the apparatus.

For enhanced reliability, and therefore safety, it is often the case that each of the plurality of control valves in an aircraft fuel supply system is operated by two independent actuator motors. The processor is thus adapted to receive feedback signals from each actuator motor of the plurality of control valves. In a preferred form of the invention, therefore, the signal means is adapted to output a signal to the processor simulating a feedback signal from either one of the valve actuator motors. Accordingly, the detector means and the indicator means may be respectively adapted to detect and identify the control signal which is output by the processor to the corresponding actuator motor of the particular control valve.

In a preferred form of the invention, the indicator means includes a visual display for identifying each of the detected control signals output by the processor. The visual display may take the form of a display screen, such as an LCD. Alternatively, the visual display may comprise one or more lamps or light-emitting diodes (LEDs), with each lamp or light-emitting diode arranged to represent one of the control valve actuator motors, an open or closed valve state, and/or a particular one of the control valves, such that each light-emitting diode, when illuminated, may clearly identify the detected control signal output by the processor. That is, each lamp or light-emitting diode (LED) is arranged to indicate a particular valve actuator motor and/or a valve operational state.

In a preferred form of the invention, the signal means is adapted to output a plurality of signals to the processor simulating feedback signals from different control valves. Thus, the indicator means is preferably adapted to identify the control valve for which a control signal is output by the processor.

The present invention will now be described by way of example with reference to particular embodiments illustrated in the accompanying drawings. It should be understood, however, that the following description of preferred embodiments is not intended to limit the generality of the inventive concept as described above or as defined in the appended claims.

BRIEF DESCRIPTION OF THE DRAWINGS

Preferred embodiments of the invention are hereafter described with reference to the accompanying drawing figures, in which like reference characters designate like features, and in which.

DETAILED DESCRIPTION OF THE PREFERRED EMBODIMENTS

Figure 1:
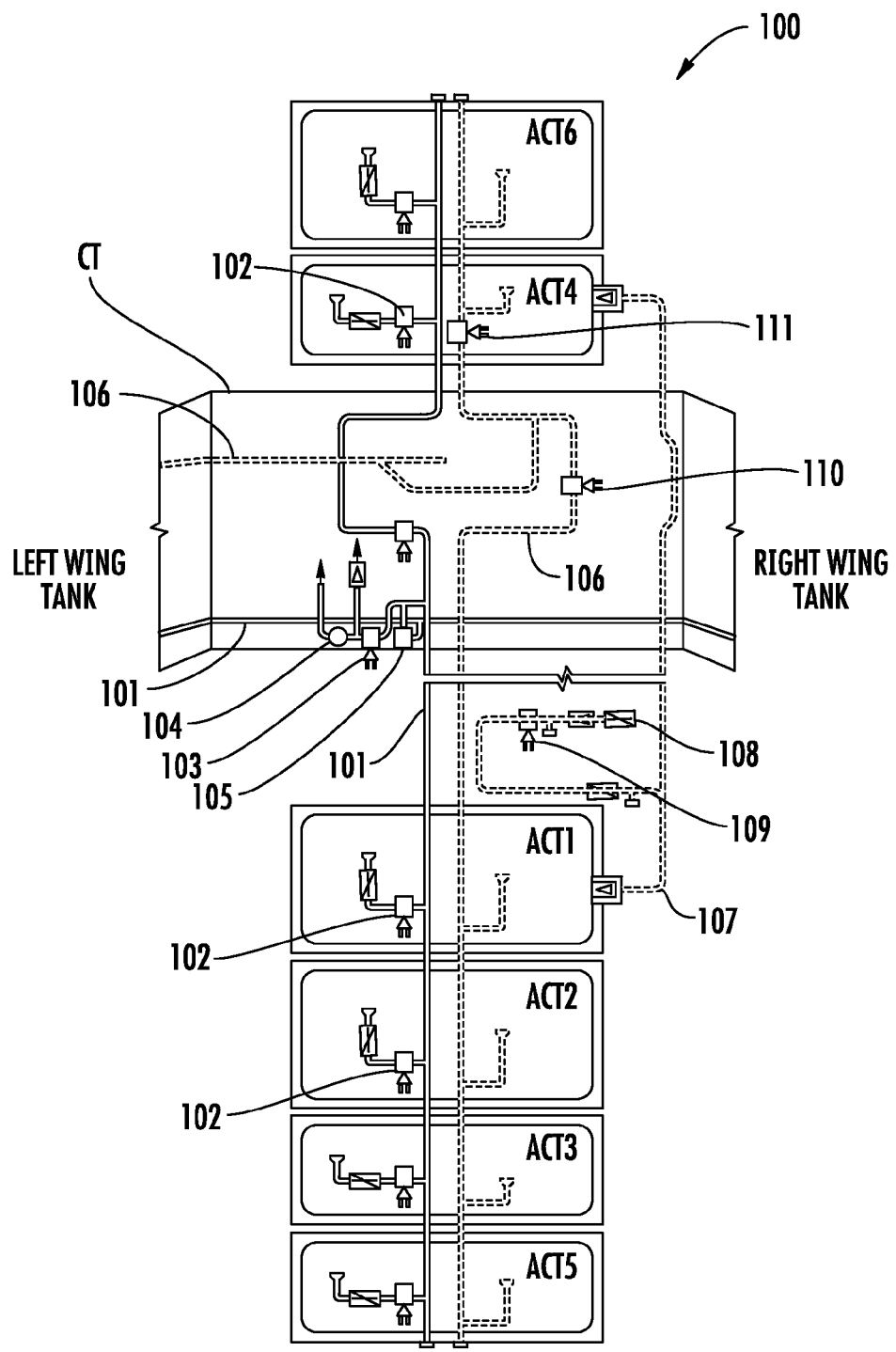
FIG. 1 is a schematic illustration of an Additional Centre Tank (ACT) fuel supply system in a commercial aircraft.

Referring firstly to FIG. 1 of the drawings, an example of an aircraft fuel supply system 100 is illustrated. This particular system is known as the Additional Centre Tank (ACT) system. In the ACT system, six "additional centre tanks" ACT1 to ACT6 are arranged in the cargo area of the aircraft. The ACT system further comprises a main fuel line 101 for conveying fuel into or out of the individual ACTs; for example, the main fuel line 101 is employed when refuelling or when transferring fuel between the ACTs and a centre tank CT arranged between the right wing tank and the left wing tank. Accordingly, the ACT system also includes a series of fuel valves, such as fuel inlet valves 102, for each of the six ACTs, a transfer valve 103 for controlling the conveyance of fuel into or out of the individual ACTs via transfer pump 104 and a refuel valve 105 which is opened when the ACT is being refuelled. In addition, the ACT system comprises a ventilation system having a vent line 106 with three different valves (not shown) as well as a system 107 for providing the ACTs with pressurized air via a pressurized cabin air intake 108. The connection between the ACTs and the pressurized air supply system can be interrupted by means of an air shut-off valve 109. The vent line 106 includes a main vent valve 110 and a forward isolation valve 111.

Furthermore, in the ACT fuel supply system 100, each of the valves (except for the refuel valve 105, which is not critical during flight) is designed to be separately actuated by two independent electric servo-motors, thus achieving greater reliability and safety through redundancy. Each of the two independent electric servo-motors respectively associated with each control valve are simply referred to here as Motor 1 (or MOT 1) and Motor 2 (or MOT 2). In view of the complexity of the ACT fuel supply system 100 and the need to ensure precise and consistent operation, the activation (i.e. the opening and closing) of the numerous individual valves in the fuel supply system is managed by a computerised valve control system (not shown) comprising an Additional Fuel Management Computer (AFMC). This AFMC control system includes at least one computer processor which generates control signals to be output to the valve actuator motors and monitors feedback from sensors and the valves themselves to regulate the operation of the fuel supply system. Thus, the AFMC processor controls and monitors the current state of each of the valves. The invention is concerned with testing and evaluating the performance of the valve control system, and in particular, with determining whether the AFMC processor is correctly interpreting feedback signals from the valves/valve actuator motors.

Figure 2:
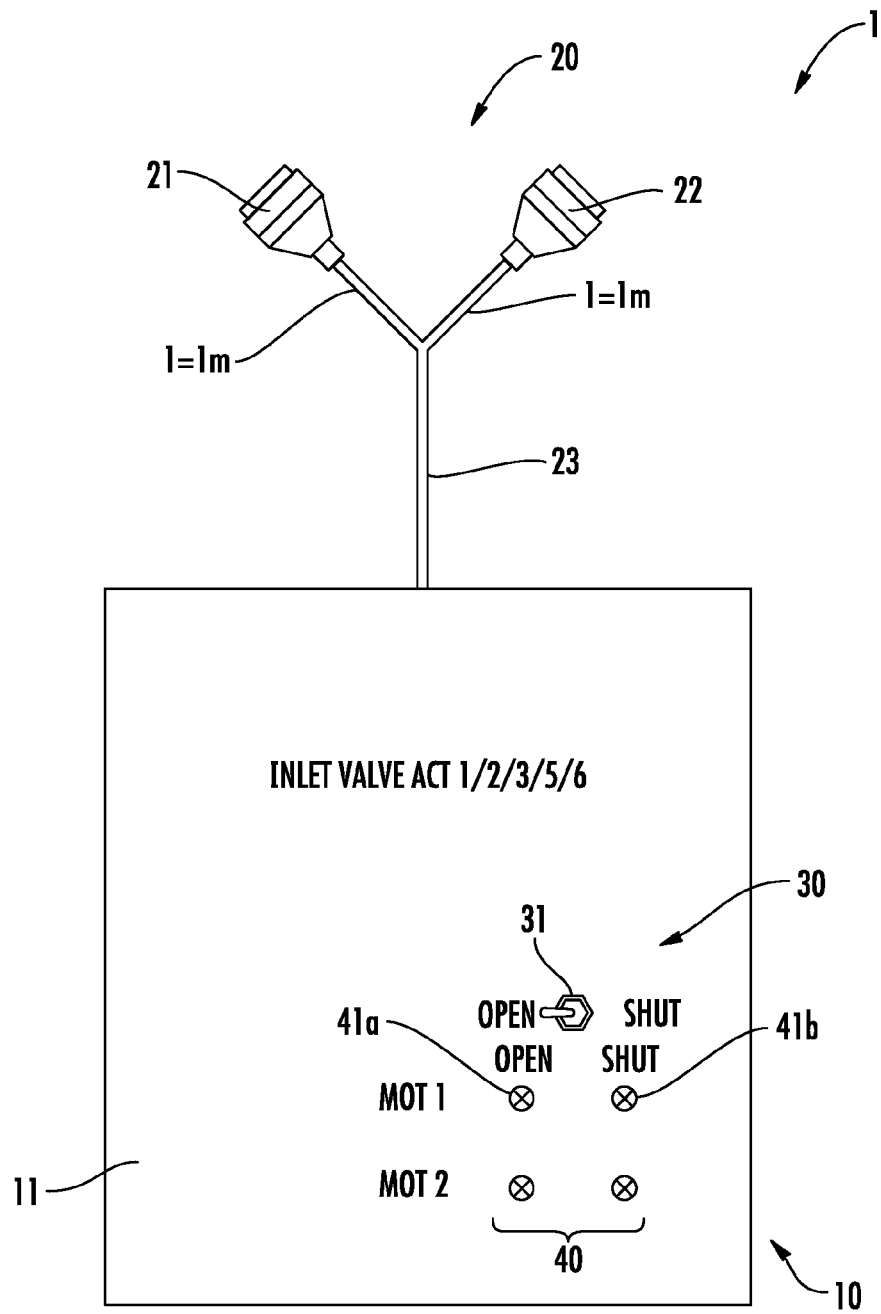
FIG. 2 is a schematic front view of a test apparatus according one embodiment of the invention.

Referring now to FIG. 2 of the drawings, an apparatus 1 according to a first embodiment of the invention is schematically illustrated. The body of the apparatus 1 comprises a generally rectangular casing 10 housing circuitry and electronic components, and connector means 20 comprising two connector elements 21, 22 electrically coupled to the components in the casing 10 by a cable 23. The cable 23 may be provided in any suitable length; in the present case, approximately 6 meters. The connector elements 21, 22 are of the plug-in type and are adapted to connect the apparatus 1 for communication with a relay device (not shown) of the valve control system, via which signals are transmitted to and from the AFMC processor for regulating valve operation in the ACT fuel supply system 100. The connector elements 21, 22 are adapted for coupling into communication with the control system processor at specific locations such that the apparatus 1 may receive control signals output by the processor to the actuator motors (i.e. Motor 1 or Motor 2) of any one of the fuel inlet valves 102 for each of the ACTs 1, 2, 3, 5 and 6.

The casing 10 of the apparatus 1 houses signal means 30 for generating a signal simulating a feedback signal from the two actuator motors (i.e. Motor 1 and Motor 2) of one or more of the fuel inlet valves 102 and outputting that simulation signal to the AFMC processor. This simulation signal which is output to the processor is a signal indicating whether the particular actuator motor (i.e. Motor 1 or Motor 2) of the valve 102 is in a valve-open or valve-closed state. In this regard, the signal means 30 comprises a switch device 31 for selecting the particular simulation signal to be output to the AFMC processor. In particular, the switch device 31 enables the user to select whether the simulation signal indicates an open or a closed state of the valve at a particular one of the actuator motors.

The casing 10 of the apparatus 1 also houses detector means 40 in the form of a collection of light-emitting diodes (LEDs) 41 arranged in separate electrical circuits corresponding to different possible control signals which may be received from the AFMC processor. In this way, the LEDs 41 are adapted to detect a control signal output by the processor to a particular one of the control valves or valve actuator motors. Portions of each LED 41 are visible through or project through an upper face 11 of the casing 10. The upper face 11 of the apparatus casing is furthermore labelled to identify the inlet valves 102 of the additional centre tanks of the fuel system 100 with which the LED circuits of the test apparatus 1 are associated and intended for use.

As noted above, each of the fuel inlet valves 102 of the ACT system 100 has two actuator motors, Motor 1 and Motor 2. Thus, each inlet valve with two independent actuator motors may receive four possible control signals from the AFMC processor; namely a signal to Motor 1 for a valve-open state, a signal to Motor 1 for a valve-shut state, a signal to Motor 2 for a valve-open state, and a signal to Motor 2 for a valve-shut state. Thus, the upper face 11 of the casing 10 is designed to form a display panel for the user which, during use of the apparatus 1, provides immediate information to the user on the signals detected from the processor—i.e. whether the processor has registered a particular one of the valve actuator motors MOT 1 and MOT 2 as placing the valve in the "OPEN" state or the "SHUT" state. Thus, one of the LEDs 41a is labelled to indicate a valve-open control signal from the processor to Motor 1 and one of the LEDs 41b is labelled to denote a valve-shut control signal from the processor to Motor 1. The same applies for Motor 2.

Figure 3:
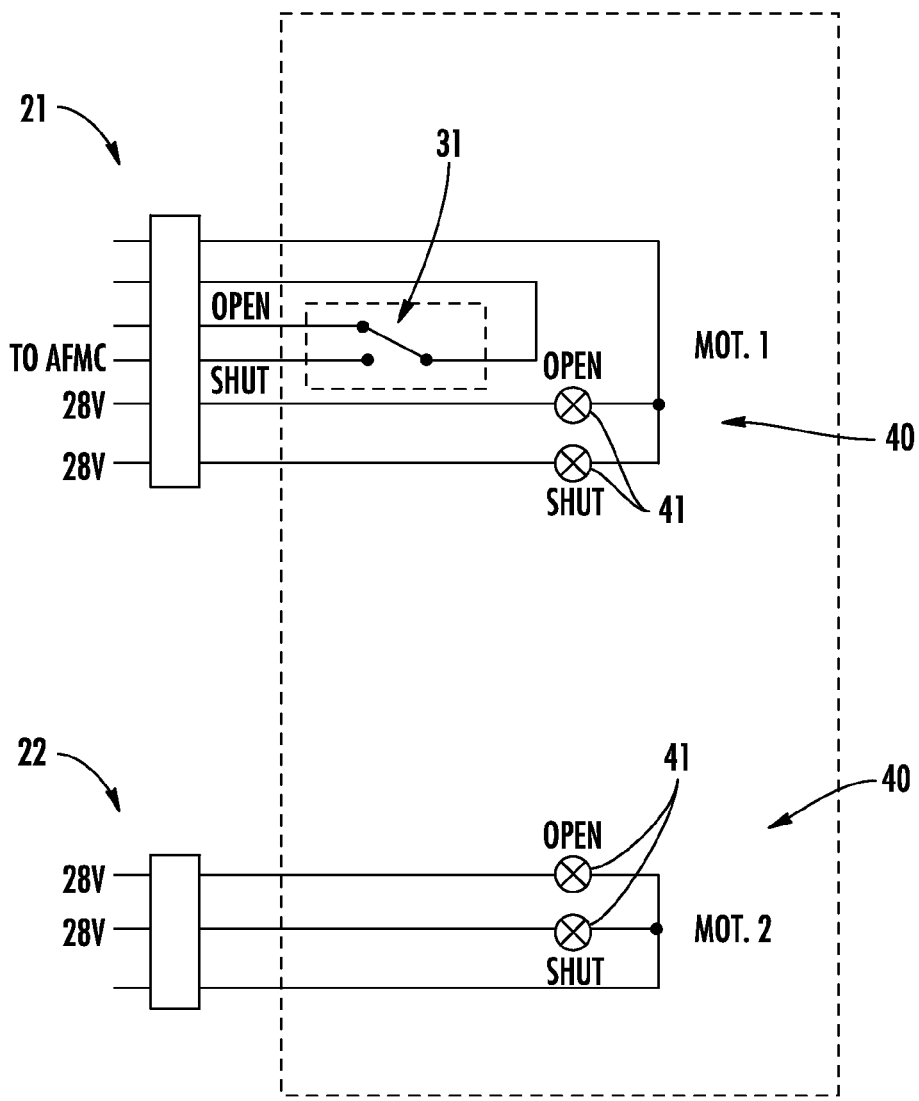
FIG. 3 is a schematic circuit diagram for the connector plugs of the test apparatus shown in FIG. 2.

With reference now to FIG. 3 of the drawings, the circuit arrangement of the apparatus 1 is schematically illustrated, with the LEDs 41 represented by a crossed circle. The connector elements 21, 22 are represented at the left-hand side of FIG. 3 and the individual circuits of each connecting element 21, 22 for connection with the processor to receive control signals for particular valve actuator motors are labelled. Similarly, the switch device 31 of the signal means is illustrated. The connector element 21 is adapted for output and input of signals associated with the first valve actuator motor, Motor 1, for each valve, and the other connector element 22 is adapted for output and input of signals associated with the second valve actuator motor, Motor 2, for each valve. In each of these circuit diagrams, it will be noted that the LEDs 41 connected in the circuits for receiving an "OPEN" control signal (i.e. noting an open valve state) are coloured green, and the LEDs connected in the circuits for receiving a "SHUT" control signal (i.e. noting a shut or closed valve state) are coloured red.

In operation, the apparatus 1 of the present invention is connected to communicate with the relay device of the valve control system and is then operated to issue or output a simulated feedback signal of one of ACT inlet valves 102. In particular, the apparatus outputs a simulated feedback signal indicating a valve open or valve closed state from one of the inlet valve actuator motors, Motor 1 or Motor 2. This is achieved by the operator selecting the desired simulation signal with the switch device 31. If the AFMC processor receives and interprets the simulated feedback signal correctly, a control signal from the processor to the control valve should confirm that state. The invention therefore involves detecting a control signal from the processor and displaying same by illuminating the corresponding LED 41 on the front display panel of the apparatus. In this way, the operator can visually inspect and evaluate whether the processor has registered the correct valve actuator motor state. In the event of a fault or error by the processor, such that a particular valve control signal is not generated or output, the respective LED 41 in the test apparatus 1 will not illuminate and the operator can immediately identify which actuator motor and which particular control signal (i.e. to open or to close the valve) is not detected.

Figure 4:
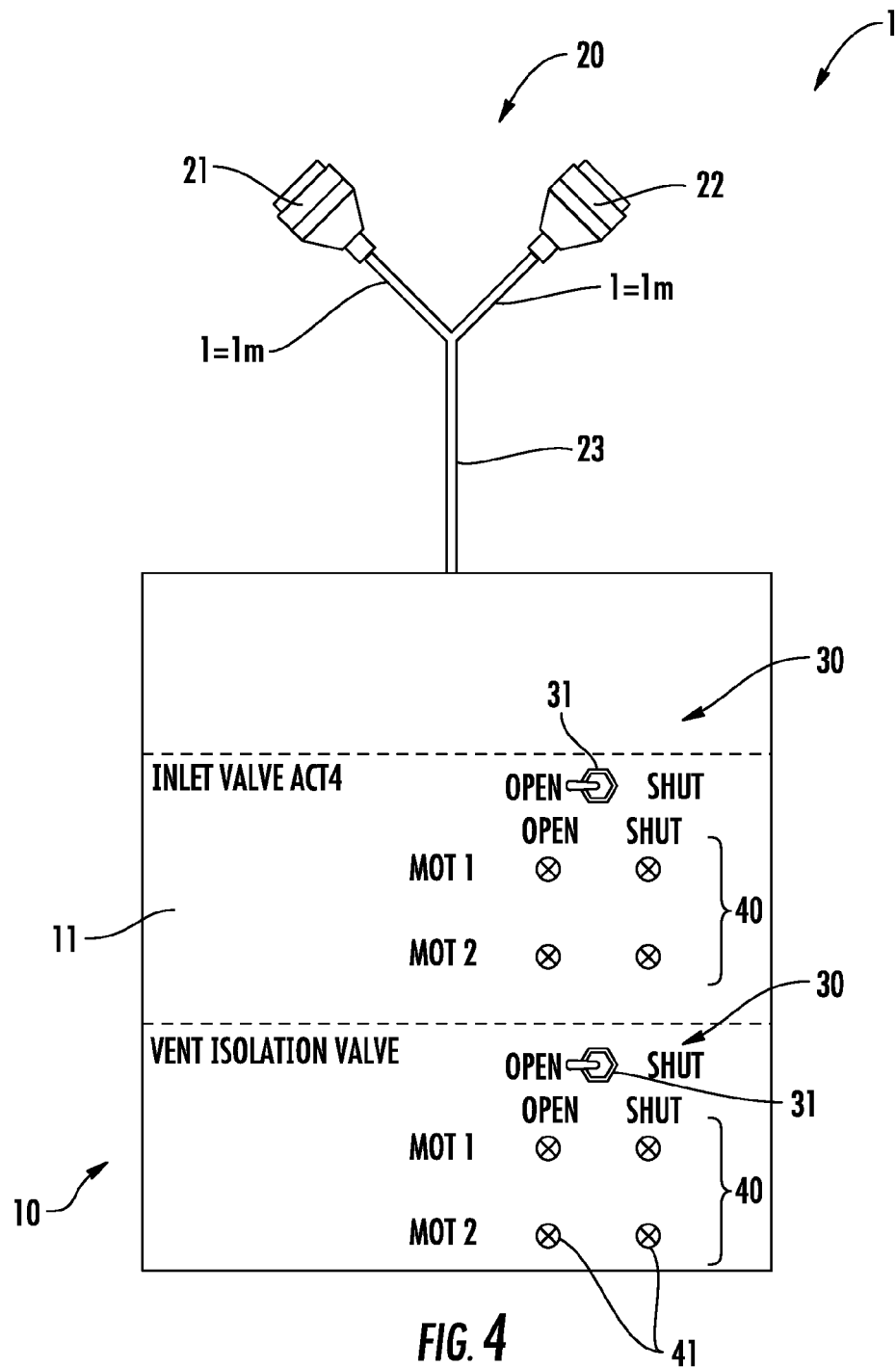
FIG. 4 is a schematic front view of a test apparatus according another embodiment of the invention.
Figure 5:
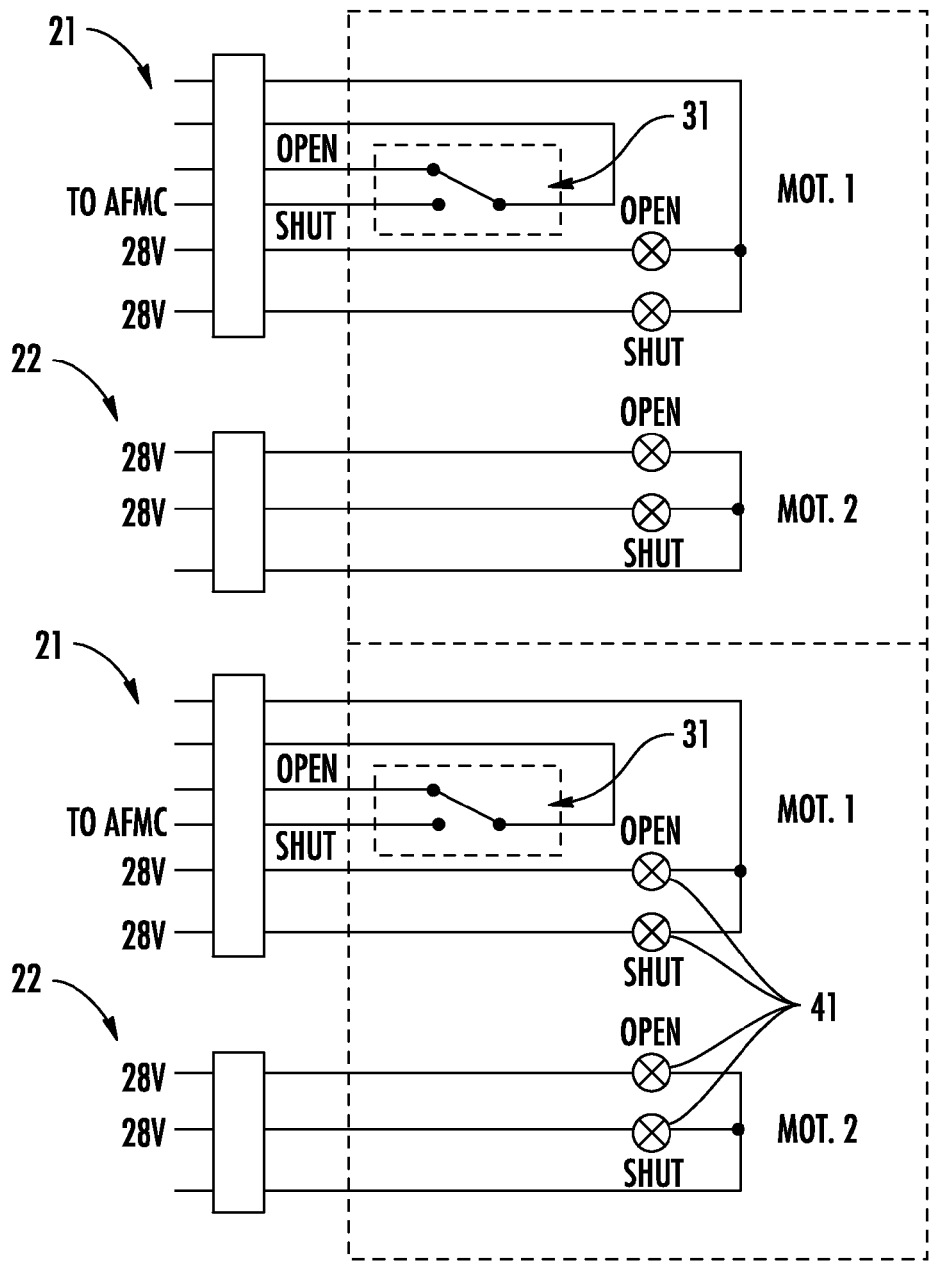
FIG. 5 is a schematic circuit diagram for the connector plugs of the test apparatus shown in FIG. 4.

With reference to FIG. 4 and FIG. 5 of the drawings, an alternative embodiment of the apparatus 1 of the invention is illustrated. In this case, a simulator for the inlet valve 102 of ACT 4 is combined with the vent isolation valve 111 also located in ACT 4, and each has its own switch device 31. The circuit diagram in FIG. 5 demonstrates that the connector elements 21, 22 have multiple circuits for sending and receiving signals to and from the AFMC processor. Again, however, the connector element 21 is associated with the first valve actuator motor, Motor 1, for each of the respective valves 102, 111, whereas the connector element 22 is associated with the second valve actuator motor, Motor 2, for each valve.

The above discussion of preferred embodiments of the invention is intended for illustrative purposes only. Accordingly, it will be appreciated that alterations may be made in the particular construction and arrangement of the parts shown in the drawings without departing from the scope of the invention as defined in the appended claims.

The invention claimed is:

1. A method of testing a valve control system in an aircraft fuel supply system having a plurality of control valves, wherein the control system includes a processor adapted to receive feedback signals from each of the plurality of control valves, wherein each of the plurality of control valves is adapted to be operated independently by two actuator motors and the processor is adapted to receive feedback signals from each actuator motor of the plurality of control valves, the method comprising the steps of:

connecting a test device to the control system such that the test device is connected for signal transmission to the processor;

the test device outputting a signal to the processor simulating a feedback signal from at least one of the control valves;

detecting a control signal which is output by the processor to the at least one of the control valves; and identifying the detected control signal which is output by the processor to the control valve, wherein the step of outputting a signal to the processor includes outputting a signal simulating a feedback signal from one of the independent actuator motors, to assess the processor's ability to recognize the individual state of each of the independent actuator motors.

2. A method according to claim 1, wherein the step of outputting a signal to the processor involves outputting a plurality of signals simulating different feedback signals from one of the control valves.

3. A method according to claim 2, wherein the detecting step involves detecting different control signals that are output from the processor, and the identifying step involves identifying the different control signals output by the processor.

4. A method according to claim 1, wherein each signal that is output to the processor simulates a feedback signal identifying a particular state, such as an open state or a closed state, of one of the control valves.

5. A method according to claim 4, wherein the step of outputting a signal to the processor includes selecting a signal identifying either an open or a closed state of the valve.

6. A method according to claim 1, wherein the step of identifying the detected control signal which is output by the processor to the control valve includes displaying corresponding information for visual observation.

7. A method according to claim 1, wherein the step of outputting a signal to the processor involves outputting signals simulating feedback signals from different control valves, and the step of detecting a control signal involves detecting control signals that are output from the processor to the different control valves.

8. An apparatus for testing a valve control system in an aircraft fuel supply system having a plurality of control valves, wherein the control system includes a processor adapted to receive feedback signals from each of the plurality of control valves, wherein each of the plurality of control valves is adapted to be operated by two independent actuator motors and the processor is adapted to receive feedback signals from each actuator motor of the plurality of control valves, the apparatus comprising:
  connector means for connection to the control system such that the apparatus is adapted for signal communication with the processor,
  signal means adapted to output a signal to the processor simulating a feedback signal from one or more of the plurality of control valves;
  detector means for detecting a control signal which is output by the processor to that one or more of the plurality of control valves; and
  indicator means for identifying the detected control signal output by the processor to the control valve,
  wherein the signal means is adapted to output a signal to the processor simulating a feedback signal from one of the independent actuator motors, to assess the processor's ability to recognize the individual state of each of the independent actuator motors.

9. An apparatus according to claim 8, wherein the signal means is adapted to output a signal to the processor that simulates a feedback signal identifying a particular state, such as an open state or a closed state, of one of the control valves.

10. An apparatus according to claim 9, wherein the signal means includes switch means for selecting a simulation signal identifying either an open or a closed state of the valve.

11. An apparatus according to claim 10, wherein the detector means and the indicator means are respectively adapted to detect and identify the control signal which is output by the processor to the corresponding actuator motor of the particular control valve.

12. An apparatus according to claim 8, wherein the indicator means includes a visual display for identifying the detected control signal which is output by the processor to a particular valve.

13. An apparatus according to claim 12, wherein the visual display comprises a plurality of lamps or light-emitting diodes, each lamp or light-emitting diode representing one of the control valves, one of the actuator motors and/or an open or close valve state, such that each light-emitting diode, when illuminated, may clearly identify the detected control signal output by the processor.

14. An apparatus according to claim 8, wherein the apparatus comprises a portable, hand-held casing which houses the detector means and presents the indicator means for easy observation by a user, wherein the connector means comprises one or more connector elements for connecting the apparatus in communication with a relay device of the valve control system, the connector elements being electrically coupled with the detector means and indicator means in the casing via a cable.

15. An apparatus according to claim 14, wherein the connector means comprises two connector elements for connection to the relay device of the control system.

* * * * *